(12) United States Patent
Chai

(10) Patent No.: US 6,487,319 B1
(45) Date of Patent: Nov. 26, 2002

(54) APPARATUS AND METHOD FOR IDENTIFYING THE LOCATION OF A CODING UNIT

(75) Inventor: Bing-Bing Chai, Plainsboro, NJ (US)

(73) Assignees: Sarnoff Corporation, Princeton, NJ (US); Sharp K. K., Osaka (JP)

(*) Notice: Subject to any disclaimer, the term of this patent is extended or adjusted under 35 U.S.C. 154(b) by 0 days.

(21) Appl. No.: 09/377,381

(22) Filed: Aug. 19, 1999

Related U.S. Application Data

(60) Provisional application No. 60/108,973, filed on Nov. 18, 1998.

(51) Int. Cl.$^7$ .................................................. G06K 9/46
(52) U.S. Cl. ..................... 382/240; 382/248; 382/250
(58) Field of Search ................................. 382/240, 248, 382/250, 252; 370/216; 375/241; 703/14

(56) References Cited

U.S. PATENT DOCUMENTS

| 5,231,487 A | * | 7/1993 | Hurley et al. ............... 358/133 |
| 5,604,824 A | | 2/1997 | Chui et al. ................... 382/248 |
| 5,764,802 A | | 6/1998 | Simon ......................... 382/236 |
| 5,764,805 A | * | 6/1998 | Martucci et al. ............ 382/238 |
| 6,137,915 A | * | 10/2000 | Chai ............................ 382/240 |
| 6,269,192 B1 | * | 7/2001 | Sodagar et al. ............. 382/240 |
| 6,301,222 B1 | * | 10/2001 | Kovacevic et al. ......... 370/216 |

FOREIGN PATENT DOCUMENTS

GB 2 303 031 A 2/1997 ............ H03M/7/30

OTHER PUBLICATIONS

Redmill et al., "The RREC: An Error Resilient Technique for Coding Varibale–Lenght Blocks of Data", IEEE Transactions on Image Procesing, vol. 5, No. 4, Apr. 1996, pps. 565–574.*

Nosratinia et al., "Multi–Resolution Backward Video Coding", IEEE International Conference on Image Processing, 1995, vol. 2, pps. 563–566.*

International Search Report for PCT/US99/27387, filed Nov. 18, 1999.

* cited by examiner

*Primary Examiner*—David Moore
*Assistant Examiner*—Anh Hong Do
(74) *Attorney, Agent, or Firm*—William J. Burke

(57) ABSTRACT

An apparatus and a method for identifying the spatial location of a coding unit, e.g., a texture unit (TU), in a hierarchically decomposed image. Specifically, the invention quickly computes and identifies the "starting point" of a texture unit, by using the texture unit number and the width and height of the "DC" band.

19 Claims, 8 Drawing Sheets

APPARATUS AND METHOD FOR IDENTIFYING THE LOCATION OF A CODING UNIT

This application claims the benefit of U.S. Provisional Application No. 60/108,973 filed on Nov. 18, 1998, which is herein incorporated by reference.

The invention relates to data processing in the field of digital multimedia communications. More particularly, the invention relates to a data locating method that rapidly identifies the location of a coding unit, e.g., a texture unit.

BACKGROUND OF THE DISCLOSURE

In the field of digital multimedia communications, data streams carrying video, audio, timing and control data are packaged into various "packets". Generally, a packet is a group of binary digits that include data and control elements which are switched and transmitted as a composite whole. The data, control elements and other information are arranged in various specific formats.

Examples of such formats are disclosed in various International Standards. These standards include, but are not limited to, the Moving Picture Experts Group Standards (e.g., MPEG-1 (11172-*), MPEG-2 (13818-*) and MPEG-4 (14496-*)), H.261 and H.263. For example, MPEG defines a packet as consisting of a header followed by a number of contiguous bytes (payload) from an "elementary data stream". An elementary stream is simply a generic term for one of the coded video, coded audio or other coded bitstreams. More specifically, an MPEG-2 "transport stream" packet comprises a header, which may be four (4) or more bytes long with a payload having a maximum length of 184 bytes. Transport stream packets are part of one or more programs that are assembled into a transport stream. The transport stream is then transmitted over a channel with a particular transfer rate.

However, transmission of packets over a noisy communication channel, e.g., wireless communication, may cause the loss of packets or corruption in the packets received by a receiver/decoder. Some data streams or bitstreams may carry compressed data that are so correlated such that partial loss of a packet may cause the receiver/decoder to discard the entire packet.

Additionally, the transmission channel may also forward the packets within a "connectionless network", e.g., in accordance with Transmission Control Protocol/Internet Protocol(TCP/IP), where relevant packets may not be forwarded in successive order. Although packets are not lost or corrupted in a connectionless transfer environment, the packets that are representative of an encoded image may not arrive in the coding or scanning order in which the image was encoded.

This random reception of packets or loss of packets, require the decoder to quickly decode and then locate the decoded data as to its relative spatial location in the decoded image. The speed of the decoder in identifying the location of the data is important for several reasons.

First, low bit rate application, e.g., real time application, requires the display of the decoded image with low latency. Thus, it is important that the decoder is able to quickly map the data in accordance with its spatial location.

Second, if error recovery is necessary, e.g., implementing error concealment methods, then it is advantageous to quickly locate and map the uncorrupted data. This allows error concealment methods that are designed to exploit uncorrupted data to generate concealment data, to immediately compensate for missing data in the decoded image.

To illustrate, a compression technique may involve the transformation of an input image into transform coefficients using hierarchical subband decomposition. For example, a useful compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer. A wavelet pyramid, also known as critically sampled quadrature-mirror filter (QMF) subband representation, is a specific type of multiresolution hierarchical subband representation of an image.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes.

A typical method of coding these transform coefficients is in tree depth scan order as shown in FIG. 1, where an image is decomposed into three levels of resolution. Specifically, the wavelet coefficients are coded in tree blocks fashion, where each tree block is represented by three separate coding units called "texture units" shown with different shadings. Each texture unit is representative of a tree structure starting from the lowest or coarsest AC band to the highest or finest AC band coefficients.

In operation, the packets carrying the texture units are randomly received, lost or corrupted. Since each packet may not be received in successive order that originally generated the packets, the decoder must properly identify the decoded texture unit's relative spatial location. Thus, noisy communication channel and connectionless transfer of packets require a decoder to rapidly de-packetize and decode the data stored in the payload of the packet and to implement error recovery method, if necessary.

Therefore, there is a need in the art for an apparatus and method for quickly identifying the spatial location of a coding unit, e.g., a texture unit, in a decoded image.

SUMMARY OF THE INVENTION

An embodiment of the present invention is an apparatus and a method for identifying the spatial location of a coding unit, e.g., a texture unit (TU), in a decoded image. Specifically, the present invention quickly computes and identifies the "starting point" of a texture unit, i.e., the location of the first coefficient of the texture unit. Although there are different texture unit structures (e.g., a tree block as a TU, a slice in a subband as a TU, slices in a decomposition layer as a TU, or a square block as a TU and the like), knowing the starting point of an $k^{th}$ texture unit will allow the decoder to quickly identify and map the $k^{th}$ texture unit across one or more subbands.

More specifically, the decoder first obtains information from the packet that identifies the texture unit number, i.e., the "$k^{th}$" texture unit. The texture unit number is used to compute which color component the texture unit is located. Namely, if the input image is a color image, then each input image can be represented in three separate color components: luminance (Y), $C_r$ (U), and $C_b$ (V).

In turn, within each color component, the texture unit number is also used to compute which "subband" the texture unit is located. Namely, each decomposition level of the hierarchically decomposed image has a plurality of subbands, e.g., an HH band, an HL band and an LH band.

Finally, once a subband is identified for the texture unit, the texture unit number is used in junction with the width and height of the "DC" band to compute the starting point of the texture unit within the identified subband. In this fashion, the texture unit can be quickly identified and mapped by executing a plurality of uncomplicated arithmetic operations such as division, summation and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
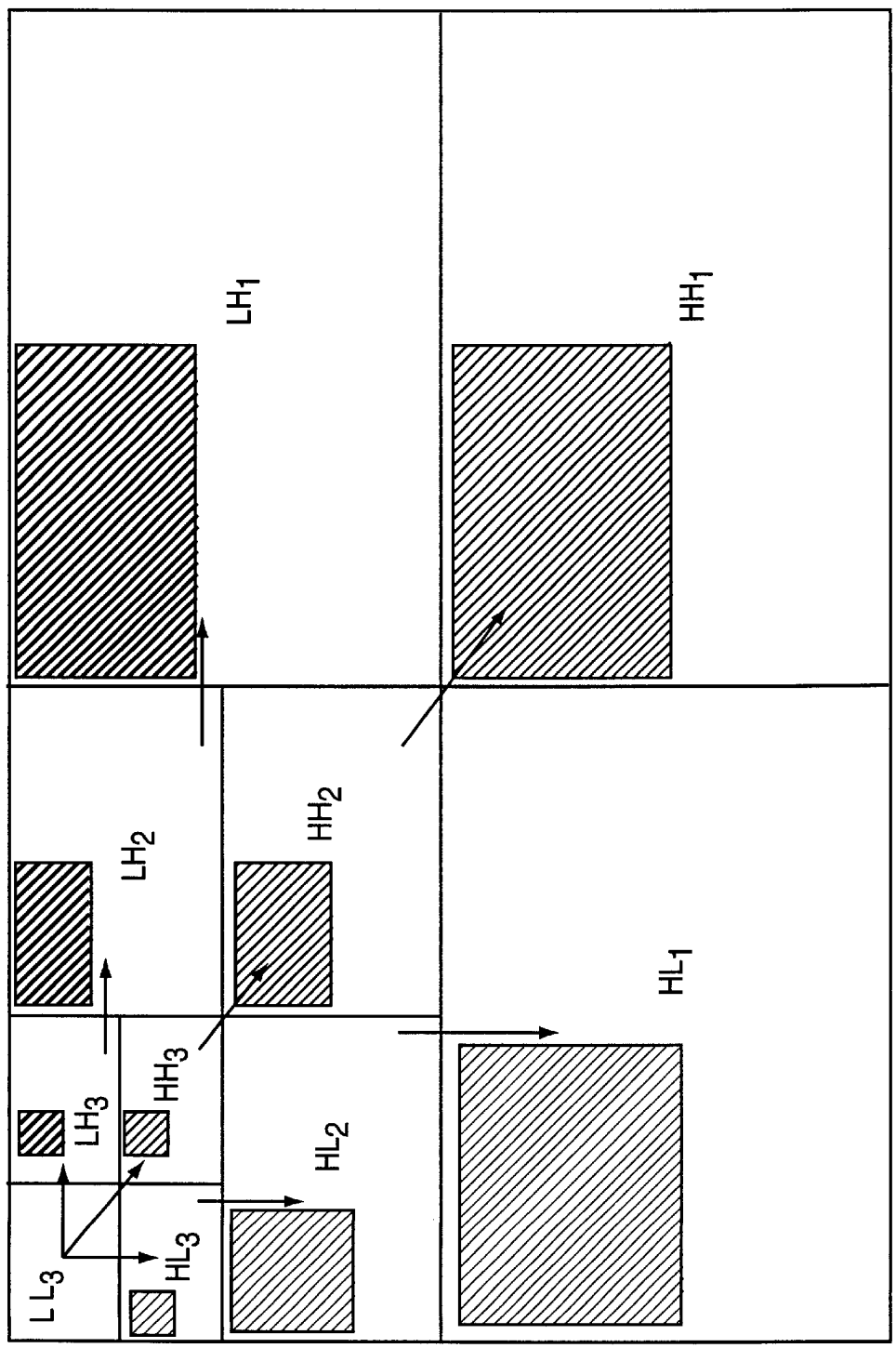
FIG. 1 is a schematic illustration of the parent-child dependencies of subbands in an image decomposed to three levels within a wavelet tree having a plurality of texture units as used in the prior art.
Figure 2:
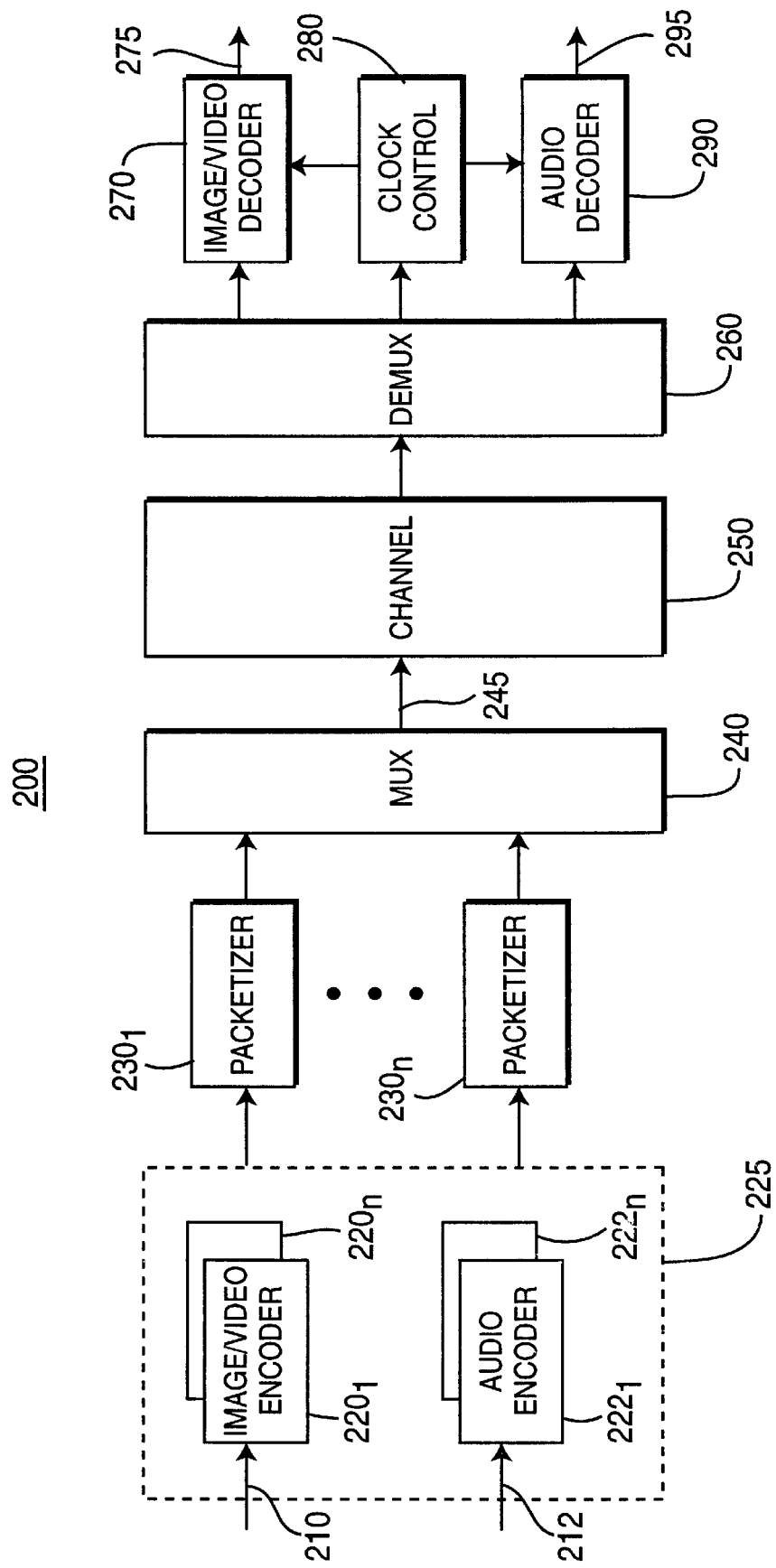
FIG. 2 depicts a block diagram of a simplified packet stream system of the present invention.

FIG. 2 depicts a block diagram of a simplified structure of a packet stream system 200 of the present invention. For illustration, a data stream such as a "transport stream" as defined in accordance with the MPEG standards is used in the packet stream system illustrated in FIG. 2. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 200 includes an image/video encoder 220 for receiving and encoding video data 210 into an elementary video bitstream. The video encoder 220 is an encoder capable of generating hierarchical subband decomposed coefficients, e.g., wavelet coefficients with or without significance-based information. The image/video encoder 220 may be a single image encoder, e.g., a Joint Photographic Experts Group (JPEG) encoder, GIF, PICT, and the like, or an encoder for an image sequence (video), e.g., a block-based or wavelet-based image encoder operating in accordance with an MPEG or ATSC standard. Throughout this disclosure the terms image sequence, images, and video are used interchangeably. In its broadest sense, the invention operates in cooperation with any form of image or image sequence encoder/decoder that would benefit from the present data locating method.

One example of such an encoder is the Sarnoff Very Low Bit Rate (VLBR) encoder, which is disclosed and claimed in U.S. Pat. No. 5,764,805 (issued on Jun. 9, 1998), and is herein incorporated by reference. Other examples of such encoders are disclosed in U.S. patent application entitled "Apparatus And Method For Encoding Zerotrees Generated By A Wavelet-Based Coding Technique" (filed on Oct. 24, 1996 with Ser. No. 08/736,114), which is herein incorporated by reference.

Similarly, the system may include an audio encoder 222 for receiving and encoding audio data 212 into an elementary audio bitstream. However, those skilled in the art will realize that a plurality of image/video encoders $220_n$, and audio encoders $222_n$ can be employed to produce a plurality of elementary bitstreams. In fact, the plurality of video and audio encoders can be collectively represented by a server 225, which may employ various encoders and/or may simply contain a plurality (or a library) of stored elementary streams in various storage media. Generally, the output of such server contains interleaved program streams.

In turn, these bitstreams are sent to packetizers 230, where the elementary bitstreams are converted into packets. Information for using the packets independently of the transport stream may be added when the packets are formed. Thus, non-audio/video data are allowed, but they are not shown in FIG. 2. It should be noted that although in a preferred embodiment, the present encoder and the packetizer are implemented in a single module, those skilled in the art will realize that the functions performed by the encoder and the packetizer can be jointly or separately implemented as required by a particular application.

The packets are received and multiplexed by the transport stream multiplexer 240 to produce a transport stream 245. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 245 is transmitted over a transmission channel 250, which may further incorporate separate channel specific encoder and decoder (not shown). Next, the transport stream 245 is demultiplexed and decoded by a transport stream demultiplexor 260, where the elementary streams serve as inputs to video decoder 270 and audio decoder 290, whose outputs are decoded video signals 275 and audio signals 295, respectively.

Furthermore, timing information is also extracted by the transport stream demultiplexor 260 and delivered to clock control 280 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

As discussed above, the packetizer 230 organizes the bitstream from the encoder into packets for transmission. If the transmission channel 250 is noisy, the transmitted packets can be corrupted or partially lost. Although the present invention describes a method below for decoding a bitstream to quickly locate the starting point of a texture unit with respect to a spatial location by a decoder 270, it should be understood that this operation can also be performed within other modules within a larger decoding system, e.g., a depacketizer (not shown). As such, the implementation of the present invention is a matter of designer choice.

Error resilience is particularly important for packets carrying hierarchically decomposed information, i.e., hierarchical subband decomposed coefficients. Hierarchical subband decomposition provides a multi-resolution representation of an image. For example, the image is first decomposed into four subbands, LL, LH, HL, HH, each representing approximately a quarter of the entire frequency band. To obtain the next coarser scale image representation, the LL band is further divided into four subbands. The process can be repeated to form a hierarchical subband pyramid. It should be understood that hierarchical subband decomposition can apply any number of subband decompositions.

Hierarchical subband decomposed coefficients can be packetized into units called "texture packets" for error resilience. A texture packet consists of one or more coding units, named "texture units". Namely, if the texture unit is packetized into a single packet, then the packet is referred to as a texture packet. Examples of various texture unit structures are disclosed in US patent application entitled "Apparatus And Method For Forming A Coding Unit" with attorney docket 13151, which is herein incorporated by reference and is filed simultaneously herewith.

Figure 3:
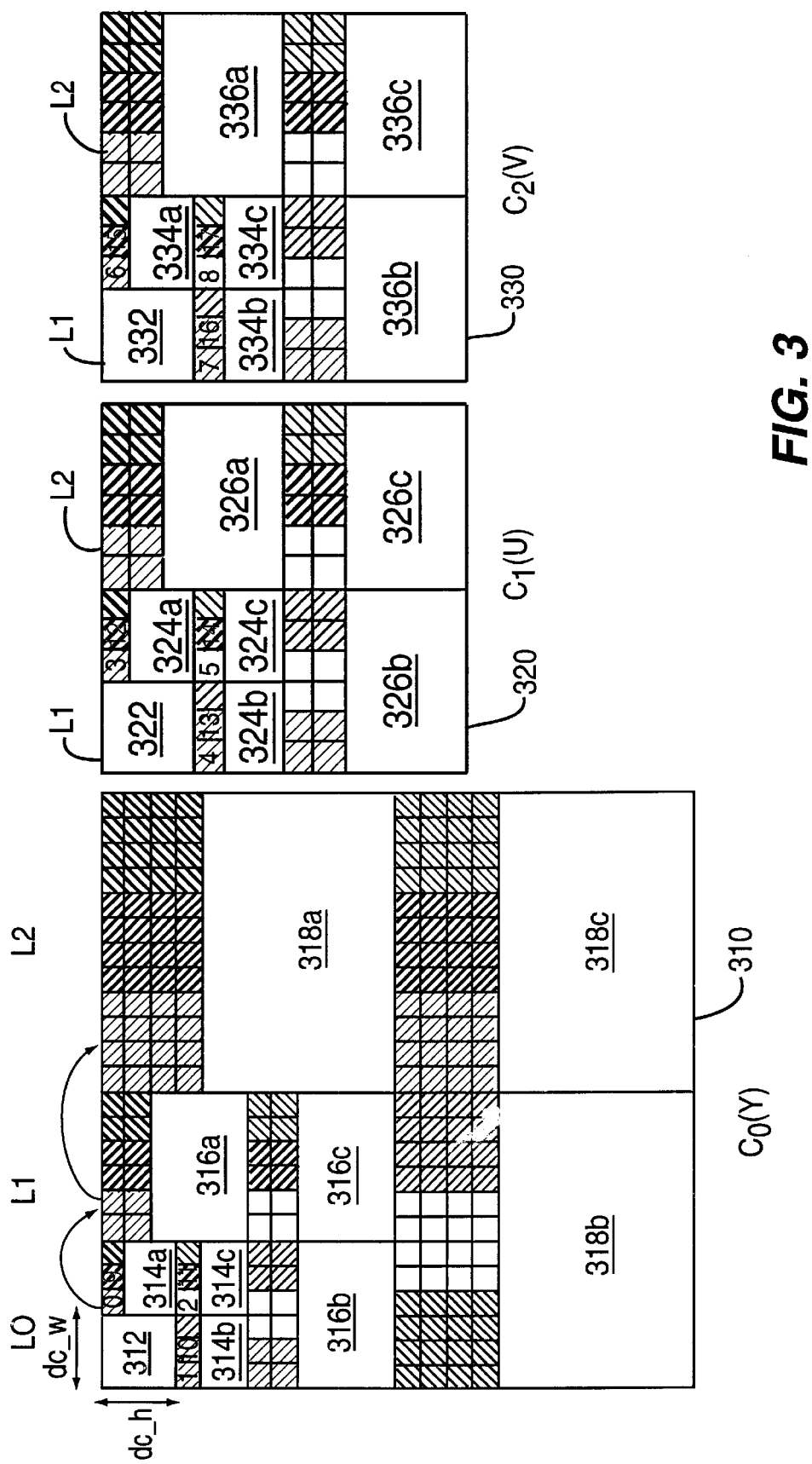
FIG. 3 is a schematic illustration of the scanning order of texture units across three color components, where each texture unit is organized in accordance with tree blocks.

FIG. 3 is a schematic illustration of three hierarchically decomposed color components of an image: luminance (Y) 310, chrominance (U) 320 and chrominance (V) 330 for an input image. It should be noted that the luminance component is decomposed into a plurality of n levels, e.g., $L_0$–$L_{n-1}$, whereas the chrominance components are decomposed into a plurality of n−1 levels, e.g., $L_1$–$L_{n-1}$. Namely, for each color input image, three color components can be generated with each chrominance component having one less decomposition level when compared to the luminance component. However, it should be understood that the present invention is not so limited and can be applied to any images having any number of color components or decomposition levels.

Specifically, FIG. 3 illustrates the scanning order of texture units across three color components, where each texture unit is organized in accordance with a tree block, i.e., in a depth first scanning order. A tree block is defined as comprising a block of coefficients that are found as one traverses along a branch of the wavelet tree, i.e., all coefficients that correspond to the same spatial location (as that of the tree root) across different decomposition levels. Thus, tree blocks as texture units are as shown in FIG. 3, where commonly shaded blocks across several decomposition levels constitute a single texture unit, e.g., texture unit "0" comprises one coefficient in level 0, four coefficients in level 1 and sixteen coefficients in level 2 and so on.

The ordering of texture units (shown illustratively from 0–17) are such that three texture units are scanned from each color component before moving on to the next color component. For example, three texture units 0–2 of the Y component (one texture from each of the three subband LH,HL,HH from level 0, respectively 314a–314c) are scanned, followed by three corresponding texture units 3–4 from the U component (one texture from each of the three subband LH,HL,HH from level 1, respectively 324a–324c), and then followed by three corresponding texture units 6–8 from the V component (one texture from each of the three subband LH,HL,HH from level 1, respectively 334a–334c) and so on. Within each subband, texture units are coded in raster scan order. Thus the texture unit number in FIG. 3 also indicates the scanning ordering of the texture units in Y, U, and V components.

In operation, the texture packets carrying the coded texture units also contain the texture unit number of the corresponding texture units, e.g., a texture packet is carrying the "kth", "kth+1" and/or "kth+n" texture units. The texture unit number information is typically stored in the packet header.

In the present invention, the decoder is able to quickly locate the starting point of a decoded texture unit by using the texture unit number, i.e., the decoder is able to map a texture unit in the order as shown in FIG. 3. A significant aspect of the present invention is that the decoder is able to locate and map the decoded texture unit without having to recount starting from the beginning of the scanning order for each decoded texture unit. It can be appreciated that such recounting will incur numerous computational cycles, especially for an input image having a large number of texture units.

Figure 6:
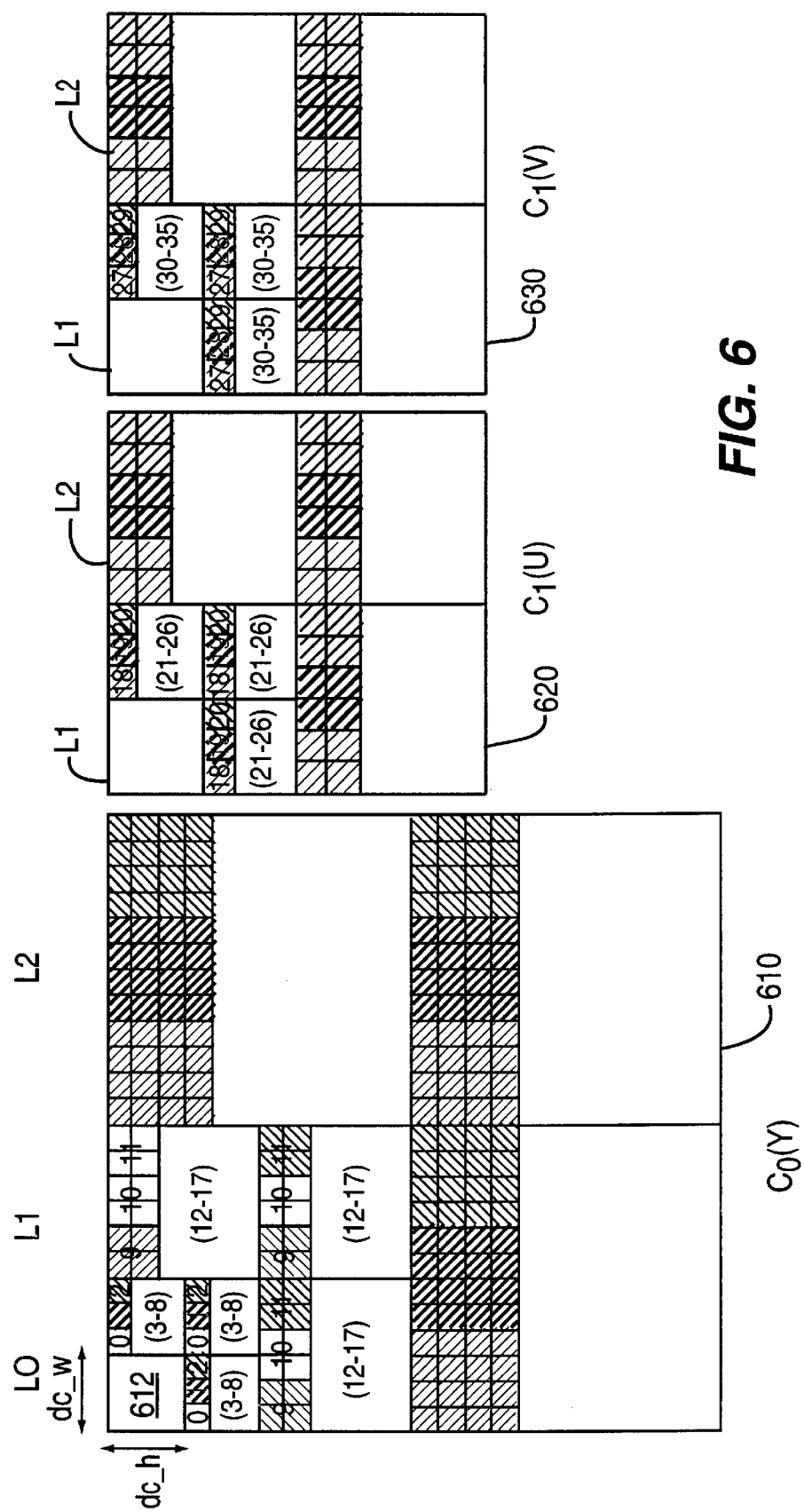
FIG. 6 is a schematic illustration of the scanning order of texture units across three color components, where each texture unit is organized in accordance with square blocks in a decomposition level.
Figure 7:
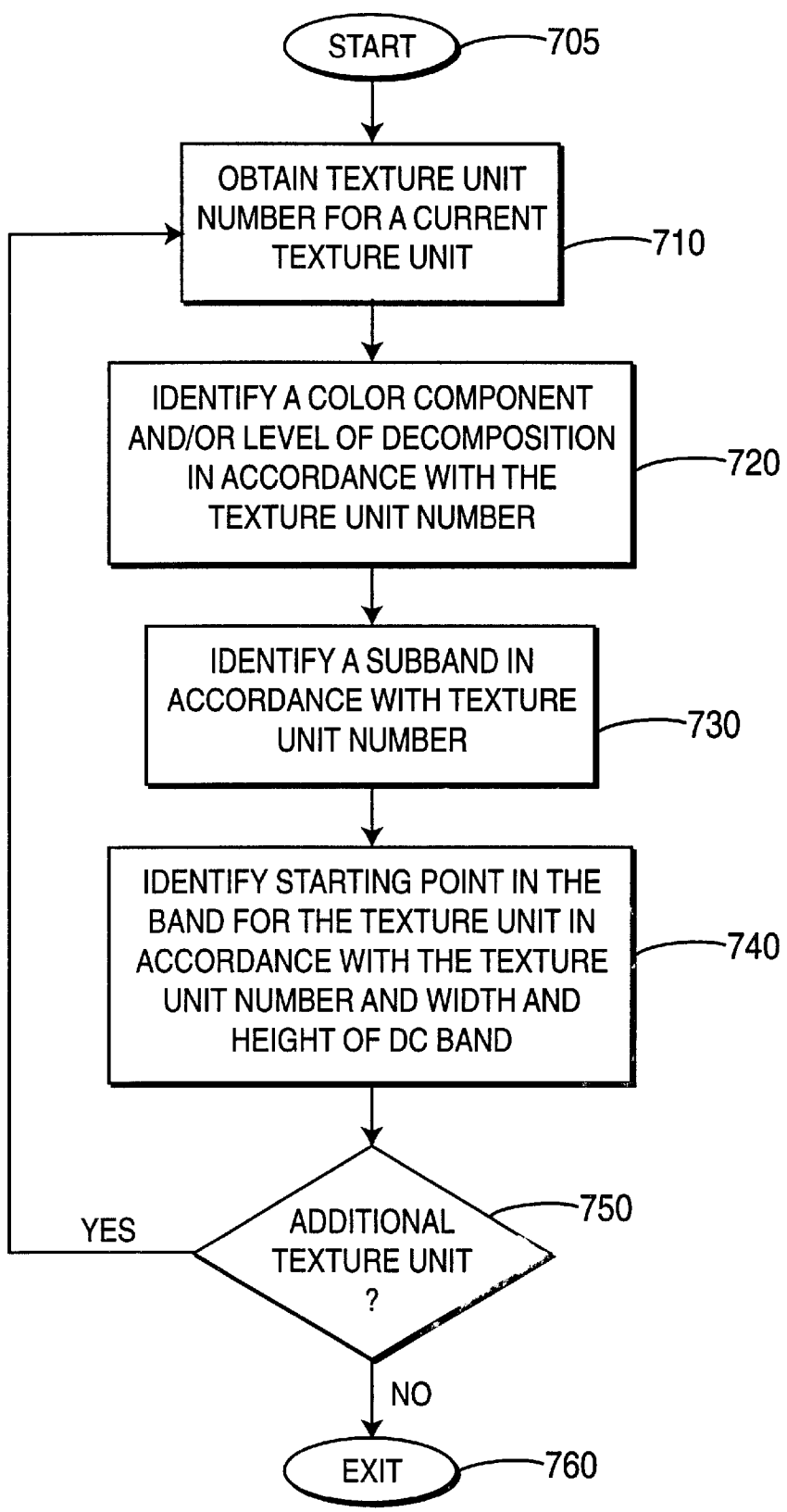
FIG. 7 illustrates a flowchart of the present data locating method.

FIG. 7 illustrates a flowchart of a data locating method 700. Specifically, FIG. 7 describes a top level general approach for implementing the present data locating method irrespective of the various texture unit structures as shown in FIGS. 3–6. Nevertheless, since texture unit structure may vary from implementation to implementation, the present disclosure provides four embodiments below to address four different texture unit structures as shown in FIGS. 3–6. As such, the reader is encouraged to consult both FIG. 7 and each of the texture unit structures as shown in FIGS. 3–6 simultaneously to gain insight into the present invention.

1) Tree Block as Texture Unit

Method 700 starts in step 705 and proceeds to step 710, where the texture unit number, e.g., "k", is obtained. Typically, the texture unit number is obtained from the header of the texture packet.

In step 720, method 700 identifies a color component in accordance with the texture unit number. Let color be denoted as 0 for Y 310, 1 for U 320, 2 for V 330; the subband be denoted as 0 for LH, 1 for HL, 2 for HH. The color component for the kth texture unit can be expressed as:

$$\text{Color} = b\%3 \qquad (1)$$

where b=k/3, where "/" denotes integer division, i.e., where only the quotient is retained and "%" denotes a mod operation, where only the remainder is retained. It should be noted that for this particular texture unit structure, it is not necessary to determine a particular decomposition level, since each texture unit proceeds from the lowest AC resolution up to the highest AC resolution level. However, where texture units are not defined across all decomposition levels, the identification of a particular decomposition level becomes significant as shown below.

In step 730, method 700 identifies a subband for the kth texture unit as follows:

$$\text{Subband} = (k\%9)\%3 \qquad (2)$$

where "%" denotes a mod operation.

In step 740, method 700 identifies a starting point (h,w) for the texture unit in the identified subband for the kth texture unit as follows:

If(subband=0), then $h=a/dc\_w$, $w=(a\%dc\_w)+dc\_w$;

If(subband=1), then $h=a/dc\_w+dc\_h$, $w=(a\%dc\_w)$;

If(subband=2), then $h=a/dc\_w+dc\_h$, $w=(a\%dc\_w)+dc\_w$. (3)

where "/" denotes integer division and "%" denotes a mod operation, "a"=k/9, and dc_h and dc_w are the height and width of the DC band 312, respectively.

In step 750, method 700 queries whether there are additional texture units for the present input image. If the query is affirmatively answered, then method 700 returns to step 710 and the steps 710–740 are repeated for the next decoded texture unit. If the query is negatively answered, then method 700 ends in step 760.

2) Slice in a Subband as Texture Unit

Figure 4:
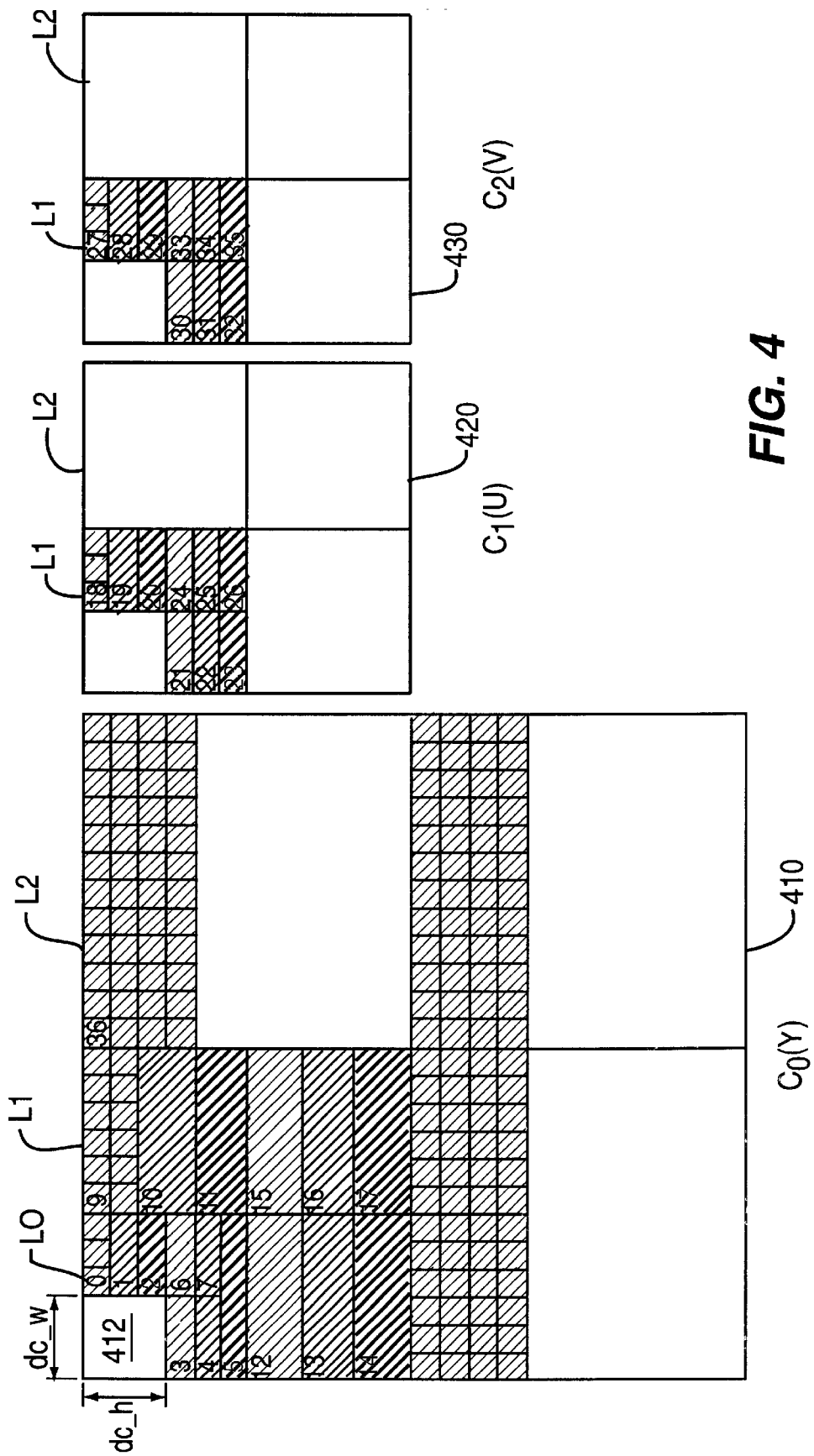
FIG. 4 is a schematic illustration of the scanning order of texture units across three color components, where each texture unit is organized in accordance with a slice in a subband.

FIG. 4 illustrates texture units that are defined as a slice in a subband corresponding to one row in the lowest AC bands. It should be noted that a slice can correspond to one or more rows in a subband. The scanning order of texture units are as follows: texture units in the Y color component for decomposition level 0 (lowest AC bands) in LH (0–2), HL (3–5), HH (6–8) order are scanned first in slice order; texture units in the Y color component for decomposition level 1 in LH (9–11), HL (12–14), HH (15–17) order are scanned next, texture units in the U color component for decomposition level 1 in LH (18–20), HL (21–23), HH (24–26) order are scanned next, texture units in the V color component for decomposition level 1 in LH (27–29), HL (30–32), HH (33–35) order are scanned next; texture units in the Y color component for decomposition level 2 in LH, HL, HH order are then scanned, texture units in the U color component for decomposition level 2 in LH, HL, HH order are then scanned, texture units in the V color component for decomposition level 2 in LH, HL, HH order are then scanned; and so on.

Referring to FIG. 7, method 700 starts in step 705 and proceeds to step 710, where the texture unit number, e.g., "k", is obtained.

In step 720, method 700 identifies a color component and a decomposition level in accordance with the texture unit number. Let color be denoted as 0 for Y 410, 1 for U 420, 2 for V 430; the subband be denoted as 0 for LH, 1 for HL, 2 for HH. The "color" and decomposition "level", for the kth texture unit can be expressed as:

If $a<3$, then the texture unit is in level=0 and color=0;

else level=$(a-3)/9+1$; color=$((a-3)/3)\%3$;

If the texture unit is not Y component, i.e., color≠0 then $l$=level−1;

else $l$=level (4)

where "/" denotes integer division and "%" denotes a mod operation, a=k/dc_h and dc_h is the height of the DC band 412.

In step 730, method 700 identifies a subband for the kth texture unit as follows:

If $a<3$, then subband=$a$;

else subband=$(a-3)\%3$ (5)

where "%" denotes a mod operation, a=k/dc_h and dc_h is the height of the DC band 412.

In step 740, method 700 identifies a starting point (h,w) for the texture unit in the identified subband for the kth texture unit as follows:

If subband=0, then $h=b*TU\_height$, $w=band\_width$;

If subband=1, then $h=b*TU\_height+band\_height$, $w=0$;

If subband=2, then $h=b*TU\_height+band\_height$, $w=band\_width$ (6)

where "%" denotes a mod operation, band_height=dc_h*TU_height, band_width=dc_w*TU_height, b=k%dc_h, TU_height=$2^l$, and dc_w is the width of the DC band 412.

In step 750, method 700 queries whether there are additional texture units for the present input image. If the query is affirmatively answered, then method 700 returns to step 710 and the steps 710–740 are repeated for the next decoded texture unit. If the query is negatively answered, then method 700 ends in step 760.

3) Slices in a Decomposition Layer as Texture Unit

Figure 5:
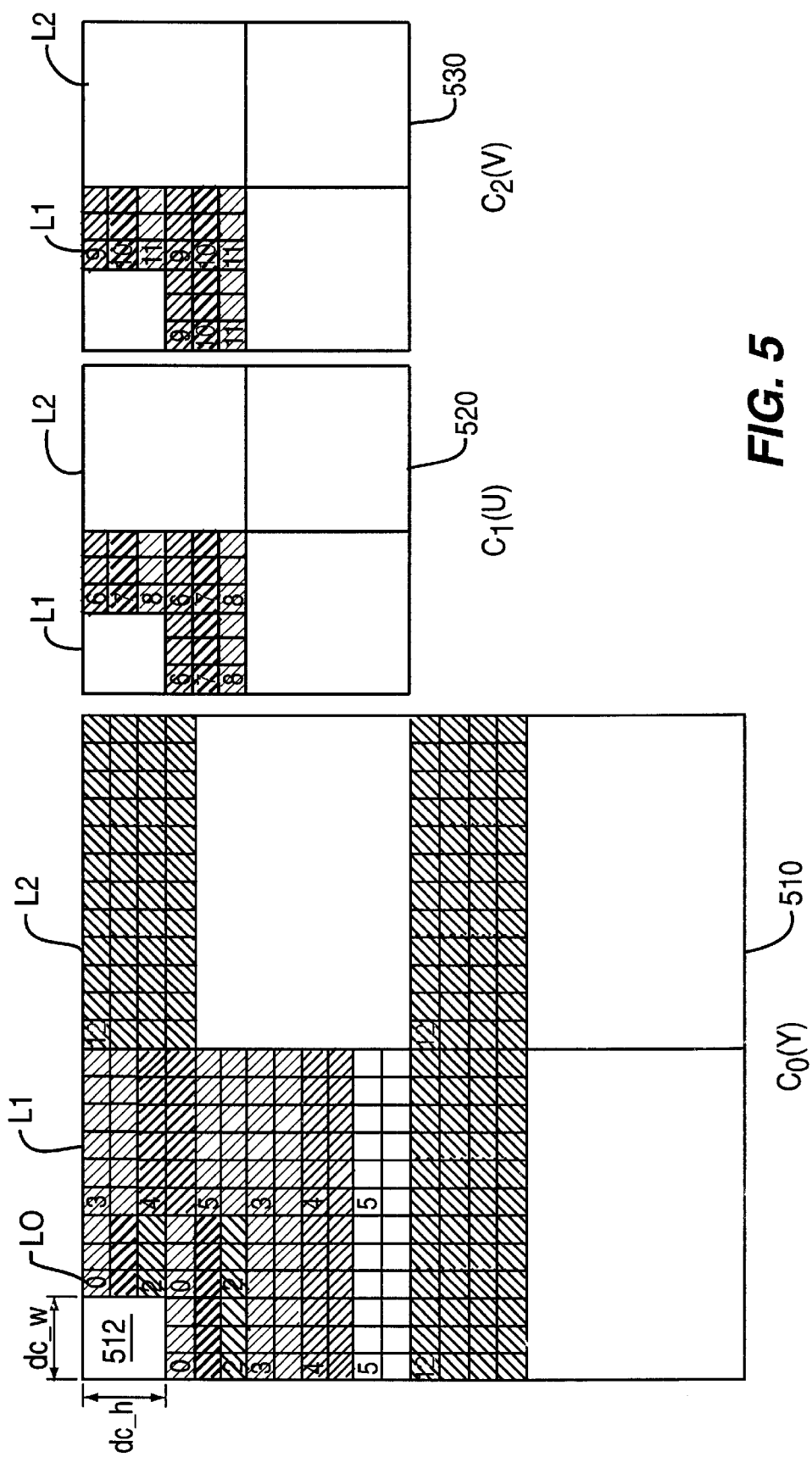
FIG. 5 is a schematic illustration of the scanning order of texture units across three color components, where each texture unit is organized in accordance with slices in a decomposition level.

FIG. 5 illustrates texture units that are defined as slices that correspond to one slice for each of the subbands for a given decomposition level, e.g., the first slice for subbands LH, HH, and HL in decomposition level 0 constitute one texture unit. Again, it should be noted that a slice can correspond to one or more rows in a subband. The scanning order of texture units are as follows: all texture units of the Y component for decomposition level 0 (lowest AC bands) are scanned first; all texture units of the Y component for decomposition level 1 are scanned next, all texture units of the U component for decomposition level 1 are scanned next, all texture units of the V component for decomposition level 1 are scanned next; all texture units of the Y component for decomposition level 2 are scanned next, all texture units of the U component for decomposition level 2 are scanned next, all texture units of the V component for decomposition level 2 are scanned next; and so on.

Referring to FIG. 7, method 700 starts in step 705 and proceeds to step 710, where the texture unit number, e.g., "k", is obtained.

In step 720, method 700 identifies a color component and a decomposition level in accordance with the texture unit number. Let color be denoted as 0 for Y 510, 1 for U 520, 2 for V 530; the subband be denoted as 0 for LH, 1 for HL, 2 for HH. The "color" and decomposition "level", for the kth texture unit can be expressed as:

If $a=0$, then level=0; color=0;

Else level=$(a-1)/3+1$; color=$(a-1)\%3$;

If color≠0, $l$=level−1

Else $l$=level (7)

where "/" denotes integer division, a=k/dc_h and dc_h is the height of the DC band 512.

Step 730 is skipped in this embodiment since it is not necessary to determine a specific subband for the kth texture unit. Namely, each texture unit defined by its texture unit structure includes one or more slices from all the subbands in the same level.

In step 740, method 700 identifies a starting point (h,w) for the kth texture unit as follows:

$h=b*TU\_height$, $w=band\_width$ (8)

where "%" denotes a mod operation, b=k%dc_h, band_height=dc_h*TU_height, band_width=dc_w*TU_height, TU_height=$2^l$, and dc_w is the width of the DC band 512.

In step 750, method 700 queries whether there are additional texture units for the present input image. If the query is affirmatively answered, then method 700 returns to step 710 and the steps 710–740 are repeated for the next decoded texture unit. If the query is negatively answered, then method 700 ends in step 760.

4) Square Blocks in a Decomposition Layer as a Texture Unit

FIG. 6 illustrates texture units that are defined as square blocks in a decomposition level that correspond to one or more square blocks of coefficients across each of the subbands for a given decomposition level, e.g., the first square block for subbands LH, HH, and HL in decomposition level 0 constitute one texture unit. Specifically, the texture unit structure or definition in FIG. 6 can be perceived as a subset of the texture unit definition of FIG. 5. The scan order is similar to that in FIG. 5 with the texture units in the same wavelet decomposition layer being encoded in raster scan.

Specifically, the scanning order of texture units are as follows: all texture units of the Y component for decomposition level 0 (lowest AC bands) are scanned first; all texture units of the Y component for decomposition level 1 are scanned next, all texture units of the U component for decomposition level 1 are scanned next, all texture units of the V component for decomposition level 1 are scanned next; all texture units of the Y component for decomposition level 2 are scanned next, all texture units of the U component for decomposition level 2 are scanned next, all texture units of the V component for decomposition level 2 are scanned next; and so on.

Referring to FIG. 7, method 700 starts in step 705 and proceeds to step 710, where the texture unit number, e.g., "k", is obtained.

In step 720, method 700 identifies a color component and a decomposition level in accordance with the texture unit number. Let color be denoted as 0 for Y 610, 1 for U 620, 2 for V 630; the subband be denoted as 0 for LH, 1 for HL, 2 for HH. The "color" and decomposition "level", for the kth texture unit can be expressed as:

If $a=0$, then level=0; color=0;

Else level=$(a-1)/3+1$; color=$(a-1)\%3$.

If color$\neq$0, $l$=level−1

Else $l$=level  (9)

where "/" denotes integer division, a=k/(dc_h*dc_w), "dc_w" is the width and "dc_h" is the height of the DC band 612.

Step 730 is skipped in this embodiment since it is not necessary to determine a specific subband for the kth texture unit. Namely, each texture unit defined by its texture unit structure includes one or more slices from all the subbands in the same level.

In step 740, method 700 identifies a starting point (h,w) for the kth texture unit as follows:

$h=(k\%(dc\_h*dc\_w))/dc\_w*unit\_size$;

$w=(k\%dc\_w)*unit\_size+band\_w$.  (10)

where "%" denotes a mod operation, unit_size=$2^l$, band_width=dc_w*unit_size and "k" is the texture unit number.

In step 750, method 700 queries whether there are additional texture units for the present input image. If the query is affirmatively answered, then method 700 returns to step 710 and the steps 710–740 are repeated for the next decoded texture unit. If the query is negatively answered, then method 700 ends in step 760.

In sum, the present invention provides several advantages. First, the decoder can immediately decode and map a texture unit regardless of the order that it is received, e.g., an kth texture unit could be decoded and then mapped before the reception of the kth−1 texture unit. For example, the usefulness of this capability is to address the situation where some packets are lost or corrupted.

Second, the decoder can quickly and efficiently locate the starting point of a texture unit by performing simple arithmetic operations instead of perform counting operations in accordance with the scanning order for every received texture unit.

Figure 8:
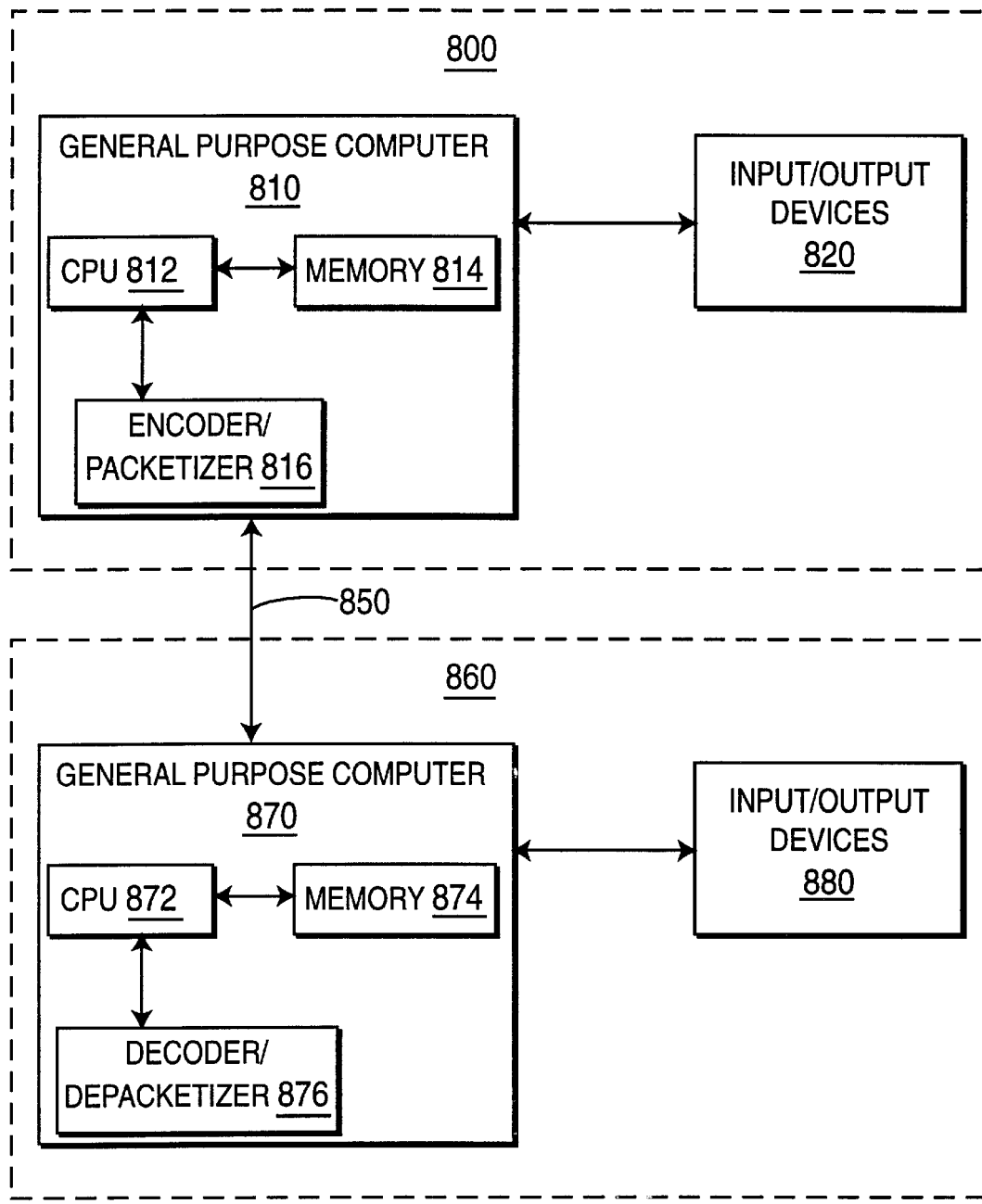
FIG. 8 illustrates a block diagram of an encoding system and a decoding system of the present invention.

FIG. 8 illustrates a block diagram of an encoding system 800 and a decoding system 860 of the present invention. The encoding system 800 comprises a general purpose computer 810 and various input/output devices 820. The general purpose computer comprises a central processing unit (CPU) 812, a memory 814 and an encoder/packetizer 816 for encoding and packetizing an image, video and/or audio signal.

In the preferred embodiment, the encoder/packetizer 816 is simply the video encoder 220, the audio encoder 222 and/or the packetizer 230 as discussed above in FIG. 2. It should be understood that the encoders and the packetizer can be implemented jointly or separately. The encoder/packetizer 816 can be physical devices, which are coupled to the CPU 812 through a communication channel. Alternatively, the encoder/packetizer 816 can be represented by a software application (or a combination of software and hardware, e.g., using application specific integrated circuits (ASIC)), where the software is loaded from a storage medium, (e.g., a magnetic or optical drive or diskette) and operated by the CPU in the memory 814 of the computer. As such, the encoder/packetizer 816 of the present invention can be stored on a computer readable medium.

The computer 810 can be coupled to a plurality of input and output devices 820, such as a keyboard, a mouse, an audio recorder, a camera, a camcorder, a video monitor, any number of imaging devices or storage devices, including but not limited to, a tape drive, a floppy drive, a hard disk drive or a compact disk drive.

The encoding system is coupled to the decoding system via a communication channel 850. The present invention is not limited to any particular type of communication channel.

The decoding system 860 comprises a general purpose computer 870 and various input/output devices 880. The general purpose computer comprises a central processing unit (CPU) 872, a memory 874 and an decoder/depacketizer 876 for receiving and decoding a sequence of encoded images.

In the preferred embodiment, the decoder/depacketizer 876 is simply any decoders that are complementary to the encoder/packetizer 816 as discussed above for decoding the bitstreams generated by the encoder/packetizer 816 and for implementing the error concealment method as described above. The decoder 876 can be a physical device, which is coupled to the CPU 872 through a communication channel. Alternatively, the decoder/depacketizer 876 can be represented by a software application which is loaded from a storage device, e.g., a magnetic or optical disk, and resides in the memory 874 of the computer. As such, any of complementary decoders of the encoder/packetizer 816 of the present invention can be stored on a computer readable medium.

The computer 860 can be coupled to a plurality of input and output devices 880, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

Although various embodiments which incorporate the teachings of the present invention have been shown and described in detail herein, those skilled in the art can readily devise many other varied embodiments that still incorporate these teachings.

What is claimed is:

1. A method for identifying and mapping a location of a current texture unit for a hierarchically decomposed input image having a plurality of decomposition levels, where each decomposition level has a plurality of subbands, said method comprising the steps of:

a) obtaining a texture unit number for the current texture unit;

b) identifying a color component in accordance with said texture unit number for said current texture unit if the input image is a color input image; and c) determining the location of the current texture unit in accordance with the width and height of a DC subband of the input image and said texture unit number.

2. The method of claim 1, further comprising the step of b1) identifying a subband for said current texture unit; and wherein said obtaining step (a) obtains a texture unit number for the current texture unit, where said current texture unit is defined as a tree block.

3. The method of claim 2, wherein said identifying step (b) identifies a color component in accordance with: color=$b\%3$; and wherein said identifying step (b1) identifies a subband in accordance with: subband=$(k\%9)\%3$; and wherein said determining step (c) determines said location of the current texture unit in accordance with:

if(subband=0), then $h=a/dc\_w$, $w=(a\%dc\_w)+dc\_w$;

if(subband=1), then $h=a/dc\_w+dc\_h$, $w=(a\%dc\_w)$;

if(subband=2), then $h=a/dc\_w+dc\_h$, $w=(a\%dc\_w)+dc\_w$;

where "color" denotes said color component, where "b"=$k/3$, where "subband" denotes one of said plurality of subbands, where "k" denotes said texture unit number, where "/" denotes integer division, where "%" denotes a mod operation, where "h" and "w" denote a starting point of said location of said current texture unit, where "a"=$k/9$, and where "dc__h" and "dc__w" denote a height and width of a DC band, respectively.

4. The method of claim 1, further comprising the step of b1) identifying a subband for said current texture unit; and wherein said obtaining step (a) obtains a texture unit number for the current texture unit, where said current texture unit is defined as a slice in a subband.

5. The method of claim 4, wherein said identifying step (b) identifies a color component in accordance with:

if $a<3$, then the texture unit is in level=0 and color=0;

else level=$(a-3)/9+1$; color=$((a-3)/3)\%3$;

if color≠0;

then $l$=level−1;

else $l$=level;

and wherein said identifying step (b1) identifies a subband in accordance with:

if $a<3$, then subband=$a$;

else subband=$(a-3)\%3$;

and wherein said determining step (c) determines said location of the current texture unit in accordance with:

if subband=0, then $h=b*TU\_height$, $w$=band__width;

if subband=1, then $h=b*TU\_height$+band__height, $w$=0;

if subband=2, then $h=b*TU\_height$+band__height, $w$=band__width;

where "/" denotes an integer division, where "%" denotes a mod operation, where a=$k/dc\_h$ and dc__h is a height of a DC band, dc__w is a width of the DC band, band__height=dc__h*TU__height, band__width=dc__w*TU__height, b=$k\%dc\_h$, TU__height=$2^l$, where "color" denotes said color component, where "level" denotes one of the plurality of decomposition levels, where "subband" denotes one of said plurality of subbands, where "k" denotes said texture unit number, where "h" and "w" denote a starting point of said location of said current texture unit.

6. The method of claim 1, wherein said obtaining step (a) obtains a texture unit number for the current texture unit, where said current texture unit is defined as slices in one of the decomposition level.

7. The method of claim 6, wherein said identifying step (b) identifies a color component in accordance with:

if $a=0$, then level=0; color=0;

else level=$(a-1)/3+1$; color=$(a-1)\%3$;

if color ≠0, $l$=level−1;

else $l$=level;

and wherein said determining step (c) determines said location of the current texture unit in accordance with:

$h=b*TU\_height$, $w$=band__width;

where "/" denotes an integer division, where "%" denotes a mod operation, where a=$k/dc\_h$, where dc__h is a height of a DC band, and dc__w is a width of a DC band, where TU__height=$2^l$, where b=$k\%dc\_h$, where band__width=dc__w*TU__height, where "color" denotes said color component, where "level" denotes one of the plurality of decomposition levels, where "k" denotes said texture unit number, where "h" and "w" denote a starting point of said location of said current texture unit.

8. The method of claim 1, wherein said obtaining step (a) obtains a texture unit number for the current texture unit, where said current texture unit is defined as a square block in one of the decomposition level.

9. The method of claim 8, wherein said identifying step (b) identifies a color component in accordance with:

if $a=0$, then level=0; color=0;

else level=$(a-1)/3+1$; color=$(a-1)\%3$;

if color≠0, $l$=level−1;

else $l$=level;

and wherein said determining step (c) determines said location of the current texture unit in accordance with:

$$h=(k\%(dc\_h*dc\_w))/dc\_w*\text{unit\_size};$$

$$w=(k\%dc\_w)*\text{unit\_size}+\text{band\_width};$$

where "/" denotes integer division, where "%" denotes a mod operation, where "a"=k/(dc_h*dc_w), where "dc_w" is a width and "dc_h" is a height of a DC band, where unit_size=2^l, where band_width=dc_w*unit_size, where "color" denotes said color component, where "level" denotes one of the plurality of decomposition levels, where "k" denotes said texture unit number, where "h" and "w" denote a starting point of said location of said current texture unit.

10. An apparatus for identifying and mapping a location of a current texture unit for a hierarchically decomposed input image having a plurality of decomposition levels, where each decomposition level has a plurality of subbands, said apparatus comprising:

means for obtaining a texture unit number for the current texture unit;

first means for identifying a color component in accordance with said texture unit number for said current texture unit if the input image is a color input image; and means for determining the location of the current texture unit in accordance with the width and height of a DC subband of the input image and said texture unit number.

11. The apparatus of claim 10, further comprising a second means for identifying a subband for said current texture unit; and wherein said obtaining means obtains a texture unit number for the current texture unit, where said current texture unit is defined as a tree block.

12. The apparatus of claim 10, further comprising a second means for identifying a subband for said current texture unit; and wherein said obtaining means obtains a texture unit number for the current texture unit, where said current texture unit is defined as a slice in a subband.

13. The apparatus of claim 10, wherein said obtaining means obtains a texture unit number for the current texture unit, where said current texture unit is defined as slices in one of the decomposition level.

14. The apparatus of claim 10, wherein said obtaining means obtains a texture unit number for the current texture unit, where said current texture unit is defined as a square block in one of the decomposition level.

15. A computer-readable medium having stored thereon a plurality of instructions, the plurality of instructions including instructions which, when executed by a processor, cause the processor to perform the steps comprising of:

a) obtaining a texture unit number for the current texture unit;

b) identifying a color component in accordance with said texture unit number for said current texture unit if the input image is a color input image; and c) determining the location of the current texture unit in accordance with the width and height of a DC subband of the input image and said texture unit number.

16. The computer-readable medium of claim 15, further comprising the step of b1) identifying a subband for said current texture unit; and wherein said obtaining step (a) obtains a texture unit number for the current texture unit, where said current texture unit is defined as a tree block.

17. The computer-readable medium of claim 15, further comprising the step of b1) identifying a subband for said current texture unit; and wherein said obtaining step (a) obtains a texture unit number for the current texture unit, where said current texture unit is defined as a slice in a subband.

18. The computer-readable medium of claim 15, wherein said obtaining step (a) obtains a texture unit number for the current texture unit, where said current texture unit is defined as slices in one of the decomposition level.

19. The computer-readable medium of claim 15, wherein said obtaining step (a) obtains a texture unit number for the current texture unit, where said current texture unit is defined as a square block in one of the decomposition level.

* * * * *